(12) United States Patent
Landes

(10) Patent No.: US 9,366,165 B2
(45) Date of Patent: Jun. 14, 2016

(54) LIQUID REMOVAL MODULE FOR REMOVING LIQUID FROM A LIQUID TANK, AND LIQUID TANK

(75) Inventor: Ewgenij Landes, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 467 days.

(21) Appl. No.: 13/994,519

(22) PCT Filed: Dec. 9, 2011

(86) PCT No.: PCT/EP2011/072350
§ 371 (c)(1),
(2), (4) Date: Jun. 14, 2013

(87) PCT Pub. No.: WO2012/080136
PCT Pub. Date: Jun. 21, 2012

(65) Prior Publication Data
US 2013/0263945 A1    Oct. 10, 2013

(30) Foreign Application Priority Data

Dec. 14, 2010    (DE) .......................... 10 2010 063 047

(51) Int. Cl.
| | |
|---|---|
| *B01D 29/19* | (2006.01) |
| *F01N 3/035* | (2006.01) |
| *B01D 29/15* | (2006.01) |
| *B01D 35/027* | (2006.01) |
| *B01D 35/30* | (2006.01) |
| *F01N 3/20* | (2006.01) |
| *F01N 13/00* | (2010.01) |

(52) U.S. Cl.
CPC ............... *F01N 3/035* (2013.01); *B01D 29/15* (2013.01); *B01D 29/19* (2013.01); *B01D 35/027* (2013.01); *B01D 35/30* (2013.01); *F01N 3/2066* (2013.01); *F01N 13/00* (2013.01); *B01D 2201/0415* (2013.01); *B01D 2201/0423* (2013.01); *F01N 2610/10* (2013.01); *F01N 2610/1406* (2013.01); *F01N 2610/1426* (2013.01); *Y02T 10/24* (2013.01); *Y10T 137/794* (2015.04)

(58) Field of Classification Search
CPC ...... B01D 29/15; B01D 35/027; B01D 29/19; B01D 2201/0415; B01D 2201/0423; B01D 35/30; F01N 3/035; Y10T 137/794
See application file for complete search history.

(56) References Cited

U.S. PATENT DOCUMENTS

| | | | | |
|---|---|---|---|---|
| 4,561,977 | A * | 12/1985 | Sasaki .................. | B01D 29/213 210/356 |
| 5,049,271 | A | 9/1991 | Cain | |
| 5,665,229 | A * | 9/1997 | Fitzpatrick ........... | B01D 35/027 210/232 |
| 5,795,468 | A * | 8/1998 | Reising ................. | B01D 29/15 210/172.4 |
| 6,276,096 | B1 * | 8/2001 | Fair .......................... | E04B 1/72 52/101 |

FOREIGN PATENT DOCUMENTS

| | | |
|---|---|---|
| CN | 101263022 | 9/2008 |
| DE | 4417923 A1 | 1/1995 |
| DE | 102006027487 A1 | 3/2007 |
| EP | 1925354 A1 | 5/2008 |
| FR | 2915185 A1 | 10/2008 |

OTHER PUBLICATIONS

International Search Report for Application No. PCT/EP2011/072350 dated Mar. 19, 2012 (3 pages).

* cited by examiner

*Primary Examiner* — Atif Chaudry

(74) *Attorney, Agent, or Firm* — Michael Best & Friedrich LLP

(57) ABSTRACT

The invention relates to a liquid removal module (1) for removing liquid from a liquid tank (18), in particular of an exhaust gas aftertreament system of a motor vehicle, comprising a main body (2) that can be arranged in and/or on the liquid tank (18). The main body has a liquid removal device (36) having at least one removal opening (7) that can be associated with the tank interior (27) and bears at least one filter element (9) associated with the removal opening (7). The filter element (9), which is elastically deformable at least in some areas, is arranged/designed in such a way that the filter element has at least one bulge (17) directed opposite the removal flow direction (26). The invention further relates to a liquid tank (18) for a vehicle, in particular for an exhaust gas aftertreament system of a motor vehicle.

19 Claims, 10 Drawing Sheets

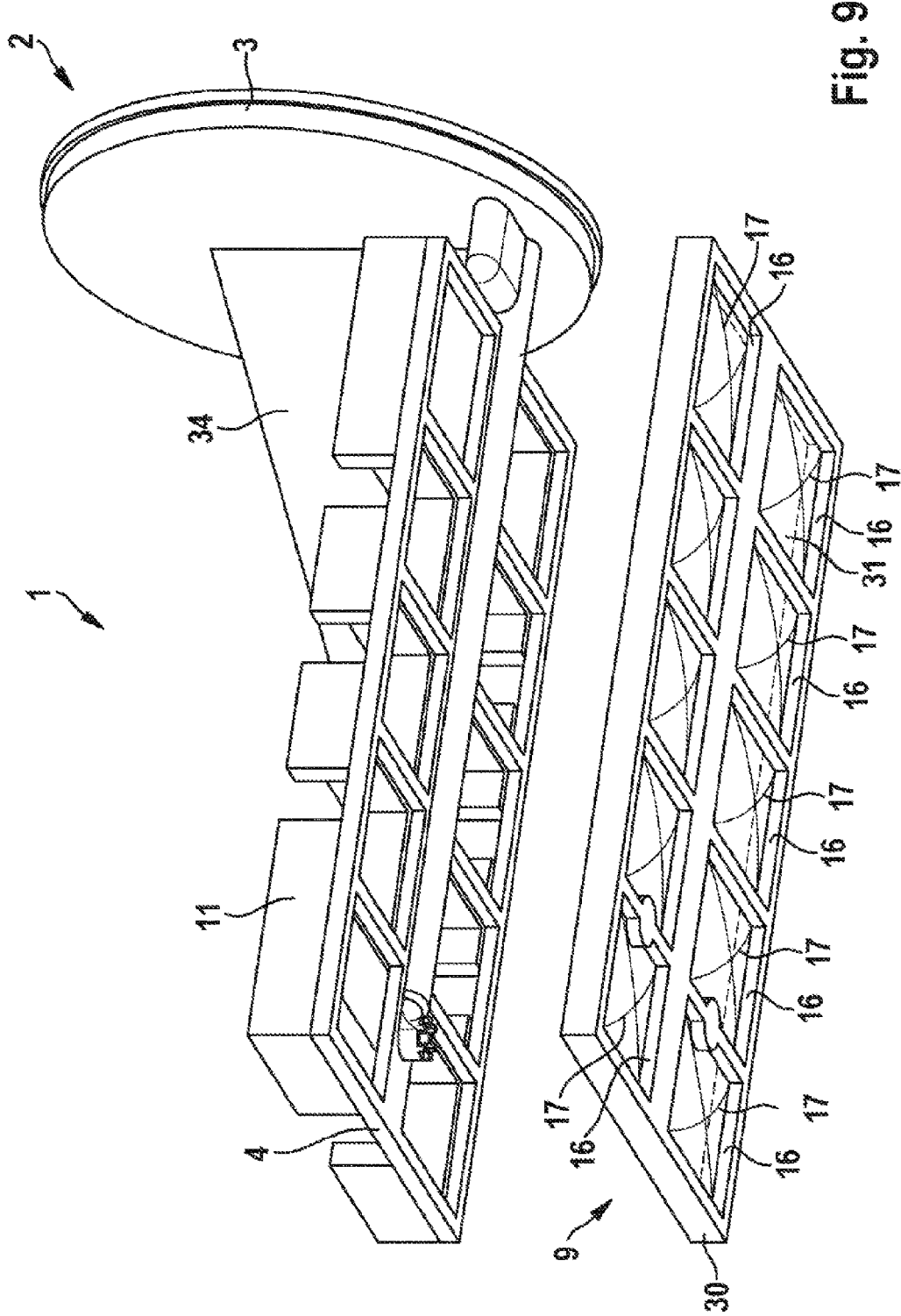

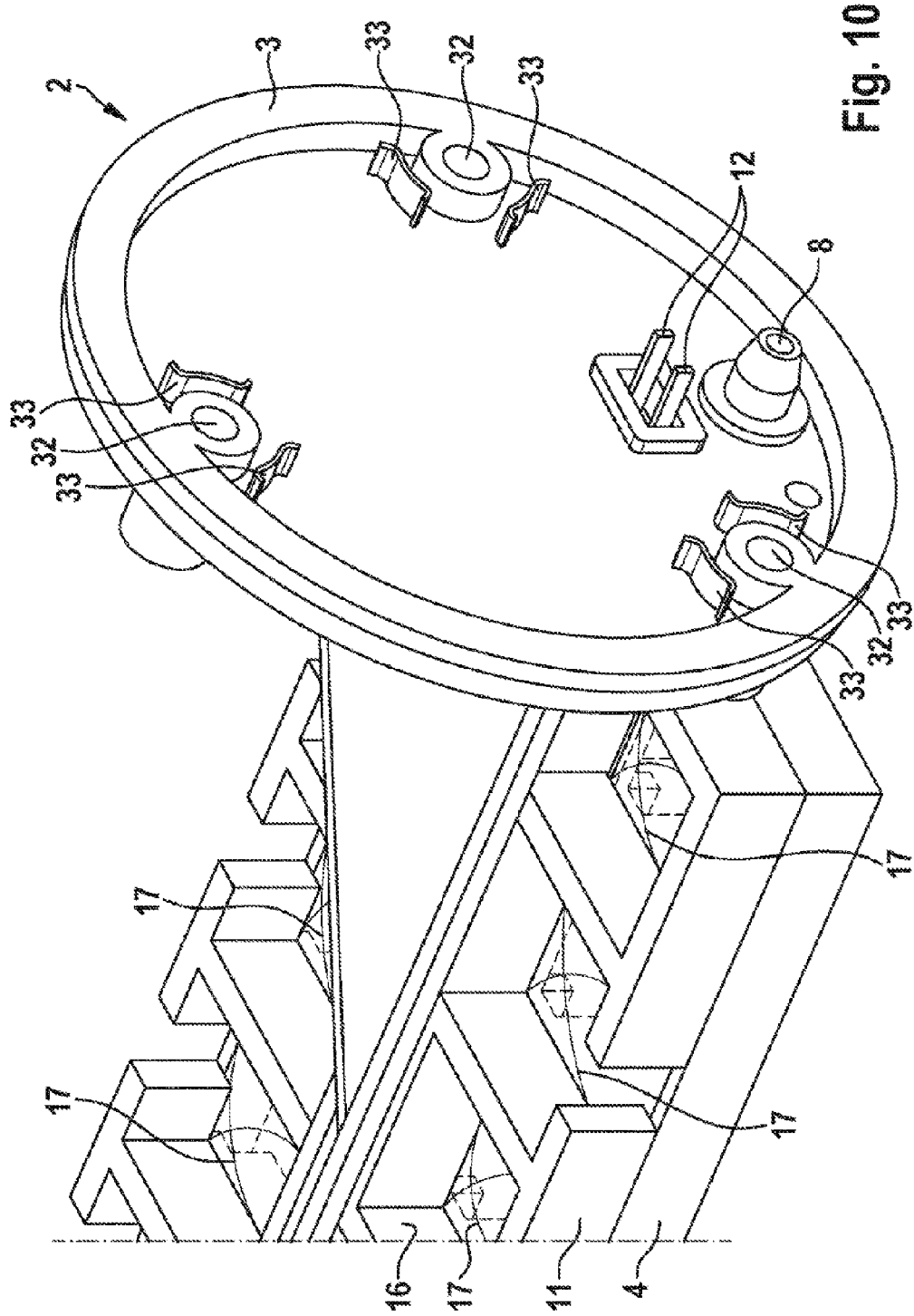

LIQUID REMOVAL MODULE FOR REMOVING LIQUID FROM A LIQUID TANK, AND LIQUID TANK

BACKGROUND OF THE INVENTION

The invention relates to a liquid removal module for removing liquid from a liquid tank, in particular of an exhaust gas aftertreatment system of a motor vehicle, comprising a main body which can be arranged in and/or on the liquid tank and has a liquid removal device with at least one removal opening which can be associated with the tank interior and bears at least one filter element associated with the removal opening.

The invention furthermore concerns a liquid tank for a vehicle, in particular for an exhaust gas aftertreatment system of a motor vehicle, having at least one wall with a tank opening, wherein in and/or on the liquid tank is arranged a liquid removal module for removing the liquid from the tank, which closes the tank opening.

Liquid removal modules and liquid tanks of the type cited initially are known from the prior art.

DE 10 2006 027 487 A1 discloses a liquid removal module which can be inserted in the tank through a tank opening of a liquid tank and which closes the tank opening in the manner of a lid. The liquid removal module comprises a liquid removal device with a removal opening associated with the tank interior, through which the liquid in the tank can be extracted. To deliver the liquid, the liquid removal device also comprises a pump integrated in the liquid removal module.

Furthermore it is known to associate a filter element with the removal opening in order in particular to protect the pump, and the consumer of the liquid present in the liquid tank, against dirt particles or similar. Furthermore it is known to arrange the filter element on the main body having the removal opening so that the liquid removal module can be formed as a compact unit.

SUMMARY OF THE INVENTION

The liquid removal module according to the invention has the advantage over known liquid removal modules that its function ability is guaranteed even in critical situations, in particular on a low fill level of the liquid tank and/or at low temperatures. The liquid removal module according to the invention is distinguished in that the filter element, which is deformable elastically at least in regions, is arranged/formed such that at least in regions it has a bulge oriented opposite the removal flow direction. The filter element therefore comprises at least one, preferably several bulges which are oriented opposite the removal flow direction so that liquid extracted through the removal opening flows through the bulge of the filter element opposite the direction of curvature. In other words the bulge of the filter element is formed convex viewed in the removal flow direction. The bulge and elastic deformability of the filter element, in particular in the region of the bulge, ensure that if the filter element for example is completely or partly not covered with liquid, the filter element deforms in the removal flow direction, i.e. the bulge of the filter element which was previously oriented outwards deforms into an inwardly oriented, concave bulge viewed in the removal flow direction. Instead of an uncovered filter element, as in the prior art, which prevents further extraction of liquid by drawing in air, the liquid removal module according to the invention allows further liquid removal which is definable by the size of bulge of the filter element. Thus removal of as much residual liquid as possible from the tank is ensured, which leads to an increase in the net tank volume.

The net volume here means the liquid quantity which can actually be removed from the tank. This is usually smaller than the actual tank volume and is reduced further by a residual quantity which cannot be extracted. Thus at a low liquid level and in extreme driving situations, or when climbing or descending hills, the time for which the filter element or mesh is not covered with liquid is bridged. Insofar as only part of the filter element is in contact with the liquid in the tank, the liquid can be extracted because the filter element allows the liquid to pass at a lower reduced pressure than the air or gases present in the tank. In addition the dirt particles are prevented from penetrating into the filter element or mesh due to the bulge, because the dirt cannot settle permanently on the filter, for example by sedimentation. In addition, due to the bulge and elastic resilience, the risk of damage for example from ice or other mechanical stresses is excluded or at least substantially reduced. Due to the bulge, the filter area is also enlarged, and hence the filter life or safety reserves increased.

Preferably for introduction of the liquid removal module into the liquid tank, the main body comprises a flange part for closing a tank opening of the liquid tank and a removal part protruding into the tank interior. The main body thus has two regions and where applicable is formed correspondingly in two pieces. The filter element and the removal opening are preferably provided on the removal part. According to a preferred embodiment the removal opening faces the tank floor while the filter element is preferably arranged above the removal opening such that it separates the floor region of the liquid tank having the removal opening from the remainder of the liquid tank.

Particularly preferably the removal part has a planar grid structure which forms several openings and can be arranged in particular parallel to the floor of the liquid tank. The filter element can easily be attached to the grid structure so that it extends over the floor of the liquid tank corresponding to the outer contour of the removal part. Preferably the filter element is arranged on the top of the grid structure while the removal opening is provided on the underside of the grid structure. Particularly preferably the removal opening is formed by the grid structure itself, wherein a removal channel formed of one piece with the grid structure leads through the grid structure or removal part, in particular as far as the flange part and in particular a delivery device arranged thereon. If the filter element cannot be purged via the hydrostatic pressure of the liquid, the arrangement of the removal opening in the upper part of the filter may be advantageous because thereby the air can be extracted more easily from the filter.

Preferably the filter element extends over the removal part and is formed bulging opposite the removal flow direction over at least one of the openings formed by the grid structure, in particular over each of the openings. By providing a bulge at each of the openings, the reserve volume which can be extracted from the tank by the liquid removal module, in particular if for example the filter is not covered by liquid (at low liquid level and in inclined positions and/or under acceleration forces), is increased accordingly as a whole.

To form the respective bulge the filter element is preferably welded or molded to the removal part in regions or all round. Thus the filter element is suitably welded or molded to the grid structure such that the filter element bulges in the corresponding direction in the region of the opening. By selecting the molding geometry or welding points or lines on the filter element, the pretension force of the bulge of the filter element can be established. Selection of the arrangement of the molding or weld seams or weld points determines how much material of the filter element should lie superficially in the region of the respective opening. The more material lies in the region, the larger the bulge formed.

According to an advantageous refinement of the invention it is proposed that the filter element comprises a filter mesh and a filter carrier, wherein the filter carrier can be/is applied structurally matching on the removal part of the main body, wherein the filter element is molded and/or welded and/or clamped to the filter carrier to form the at least one bulge. Thus for example the one or more bulges of the filter element can be produced already on production of the filter element, in that the filter mesh is recessed accordingly into the filter carrier. This simplifies the assembly of the liquid removal module. The filter element can here be clamped and/or welded and/or molded to components of the filter carrier or also between the filter carrier and the main body of the removal part to form the at least one bulge.

Preferably the filter carrier and/or the removal part are formed as a heating element, in particular plastic-coated. The removal part of the main body thus assumes a double function, firstly it clamps the filter element and secondly it serves as a heating element to heat and in particular thaw frozen liquid present in the liquid tank. The filter element can thus be arranged directly on the heating element or via the filter carrier on the main body. By the formation as a heating element, in particular the liquid in the removal region i.e. close to the removal opening can be thawed when necessary and extracted from the liquid tank, wherein here the at least one bulge of the filter element allows removal of the liquid even if liquid is thawed only in the removal region and not yet outside the liquid removal module. If the liquid volume on the side of the filter element facing the removal opening diminishes, the bulge deforms in the direction of the removal opening or the removal flow direction, so that it is also ensured that no air is drawn in from outside the filter. The heating element is preferably formed as a plastic-coated aluminum body with which in particular one or more PTC heating elements are associated.

According to an advantageous refinement of the invention it is proposed that the removal part is arranged eccentrically, in particular in the edge region of the flange part, and in particular extends substantially perpendicular to the flange part. The eccentric arrangement of the removal part on the flange part guarantees that the removal part and in particular the removal opening are arranged as far down in the liquid tank or as close to the tank floor as possible. Preferably the removal part and the flange part for this are arranged offset to each other in their height position so that a side opening can be formed in the liquid tank in a region of the side wall of the liquid tank advantageous for the opening, and the removal part nonetheless can be arranged on the tank floor. Naturally it is also conceivable to arrange the removal part and flange part parallel to each other and introduce them into the tank volume through a tank opening formed in the tank floor.

Particularly preferably the filter element surrounds the removal part of the main body which has the removal opening. The filter element is thus arranged not only in one plane, but preferably in at least two planes, above and below the removal opening so that the filter element surrounds a volume associated with the removal opening so that where applicable only liquid filtered in several stages can enter the removal opening. One or more bulges of the filter element can be provided on both the top and on the underside.

The liquid tank according to the invention is characterized by the formation of the liquid removal module as described above. This leads to the advantages already described above. Particularly preferably at least the flange part and the wall of the liquid tank are made of the same material, in particular from the same plastic, to allow simple and secure welding of the two elements to each other.

BRIEF DESCRIPTION OF THE DRAWINGS

The invention will now be described below with reference to the drawing which shows:

FIG. 9 a refinement of the liquid removal module in a perspective view, and

FIG. 10 a flange part of the liquid removal module in perspective view.

DETAILED DESCRIPTION

Figure 1:
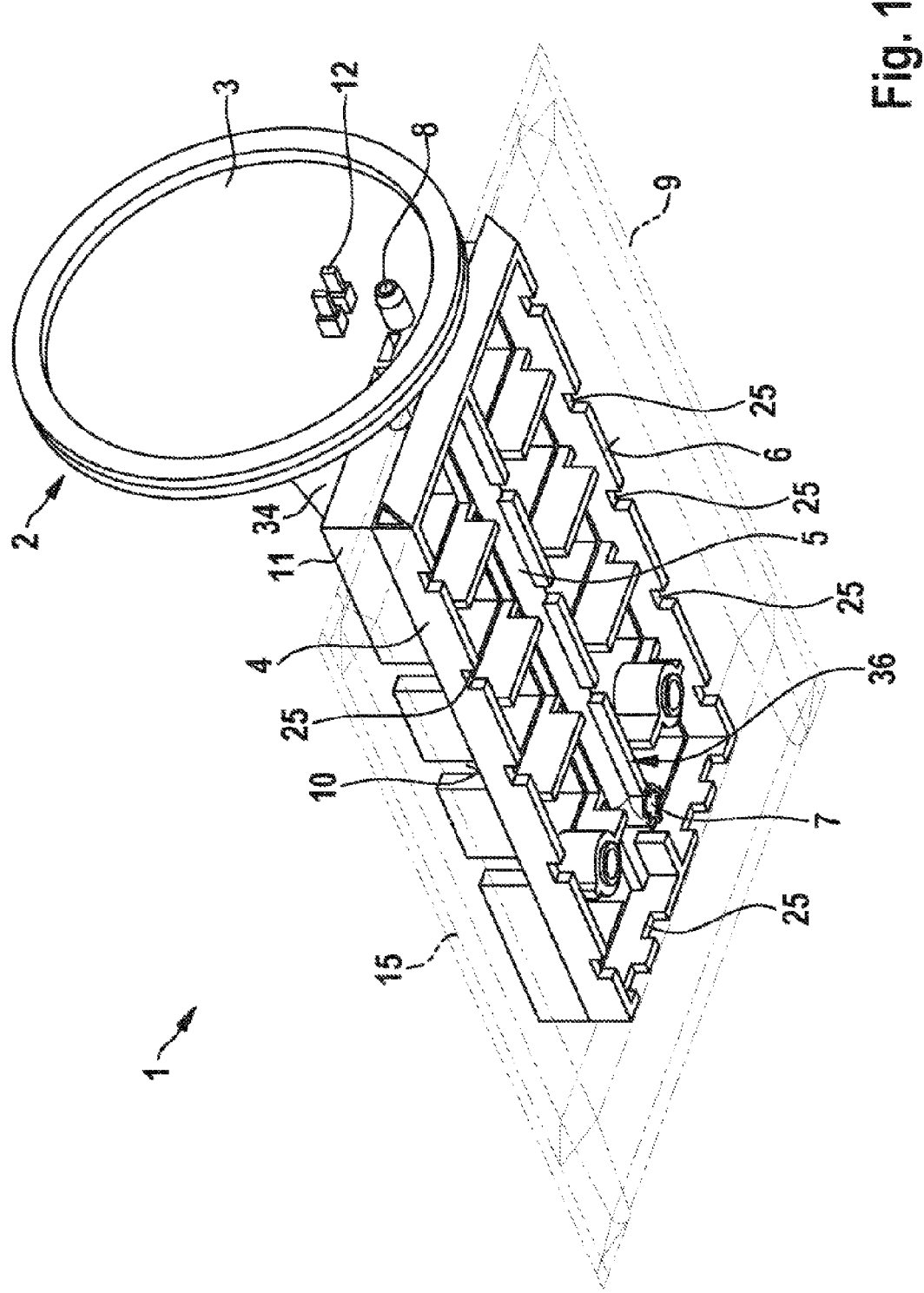
FIG. 1 a liquid removal module in a perspective view.

FIG. 1 shows in a perspective view a liquid removal module 1 which serves for installation in a liquid tank of an exhaust gas aftertreatment system of a motor vehicle. For this the liquid removal module 1 has a main body 2 which comprises a flange part 3 and a removal part 4. Preferably the main body 2 is made of high density polyethylene or HDPE plastic. The flange part 3 is formed as a lid and for this has a circular contour. The removal part 4 has a planar grid structure which extends substantially parallel to the flange part 3 or parallel to its axis. The flange part 3 and the removal part 4 are connected together via a push-fit connection but can also be connected as one piece or in another manner. A removal channel 5 also extends through the removal part 4 and opens into a removal opening 7 arranged on the underside 6 and at the other end transforms into a removal connection 8 which is formed on the outside of the flange 3. The removal opening 7 in the present case is arranged centrally on the end of the removal part 4 remote from the flange 3. The removal opening 7 and removal channel 5 are formed of one piece by the removal part 4 which is advantageously made as a plastic part. In principle it is conceivable to provide another or several further removal openings which open into the same removal channel 5 or further removal channels which lead through the removal part 4 or main body 2.

The removal part 4 is furthermore surrounded by a filter element 9 which surrounds the removal part 4 over its full periphery and protrudes at the side beyond the removal part 4. The removal opening 7 thus lies inside the filter element 9. On the top side 10 of the removal part 4 is arranged a heating element 11 which has a plastic-coated aluminum base body. The heating element 11 is formed structurally matching with the removal part 4 so that the heating element 11 has the same planar grid structure as the removal part 4 so that the two can be arranged aligned on each other. In the present embodiment example the filter element 9 lies with a region between the heating element 11 and the removal part 4. Naturally an embodiment is also conceivable in which the filter element 9 also surrounds the heating element 11. The heating element 11 has connection contacts 12 which protrude outward through the flange part 3 so the heating element 11 can be contacted electrically from the outside, for example with a plug.

The removal channel 8 and removal opening 7 and where applicable the delivery device mounted on the flange part 3 together form a liquid removal device 36 of the liquid removal module 1.

Figure 7:
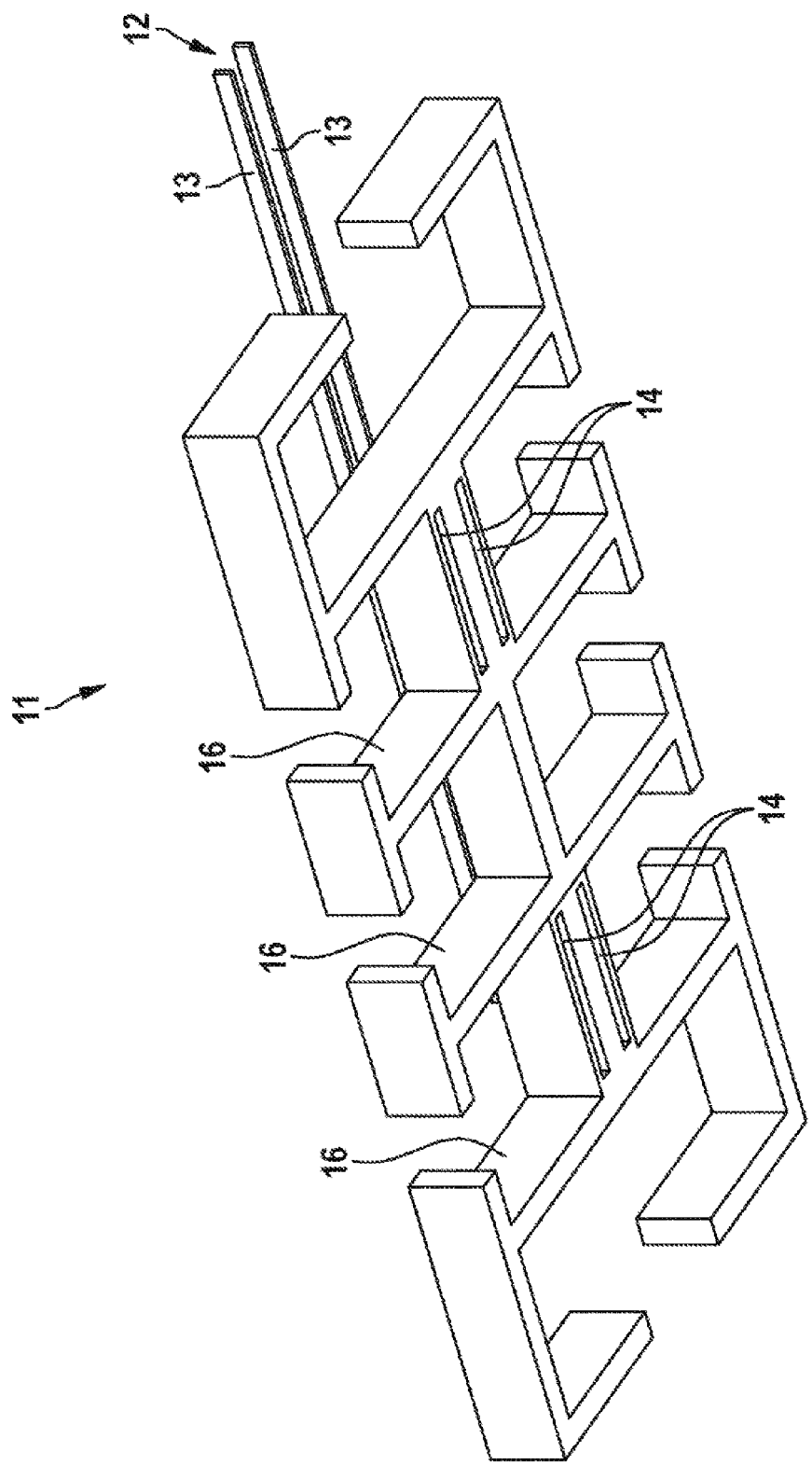
FIG. 7 a heating element of the liquid removal module in a perspective view.

FIG. 7 shows the heating element 11 in a perspective view. The connecting lines 13 forming the connection contacts 12 are also coated with plastic on production. In the middle region, several PTC heating elements 14 are provided in receiver pockets of the plastic sheathing and/or aluminum base body and are connected electrically with the connecting lines 13. When power is applied to the PTC heating elements they heat up, wherein their heat is transmitted by the aluminum base body and distributed accordingly.

Figure 2:
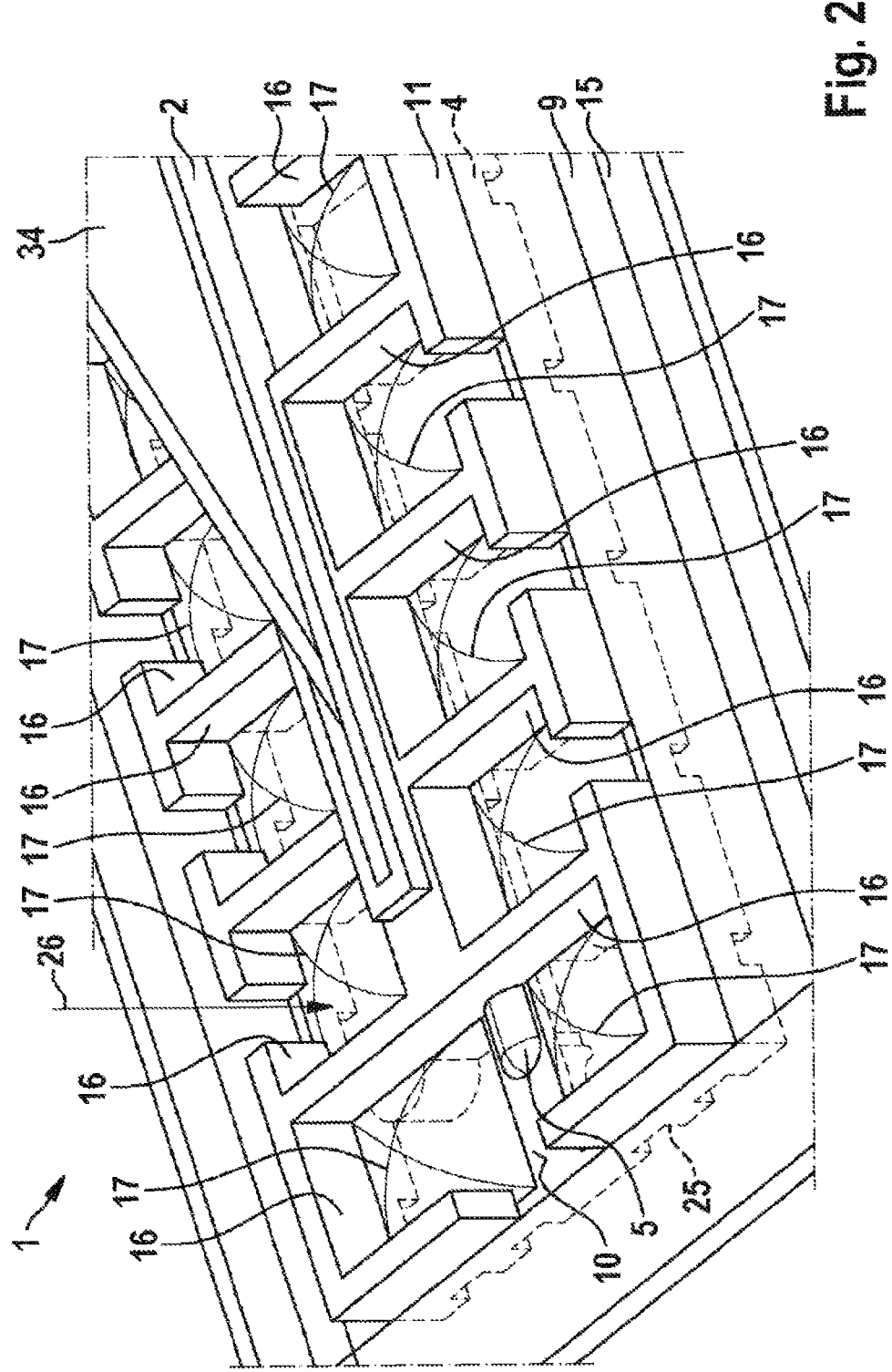
FIG. 2 an enlarged detailed view of a liquid removal module in a perspective view.

FIG. 2 shows a liquid removal module 1 in a perspective top view onto the top 10 of the removal part 4. The filter element 9 in the present embodiment example consists only of a filter mesh 15 which is formed elastically deformable. The openings 16 formed by the grid structure of the heating element 11 and the removal part 4 are covered by the filter mesh 15, wherein the filter mesh 15 or filter element 9 has a bulge 17 in the region of the respective opening 16. The bulges 17 point away from the top 10 of the removal part 4. To create the bulges 17, the filter mesh 15 or filter element 9 is glued or molded or preferably welded to the receiver part 4. It is also conceivable to clamp the filter element 9 between the heating element 11 and the receiver part 4 such that the bulges 17 exist permanently.

Figure 3:
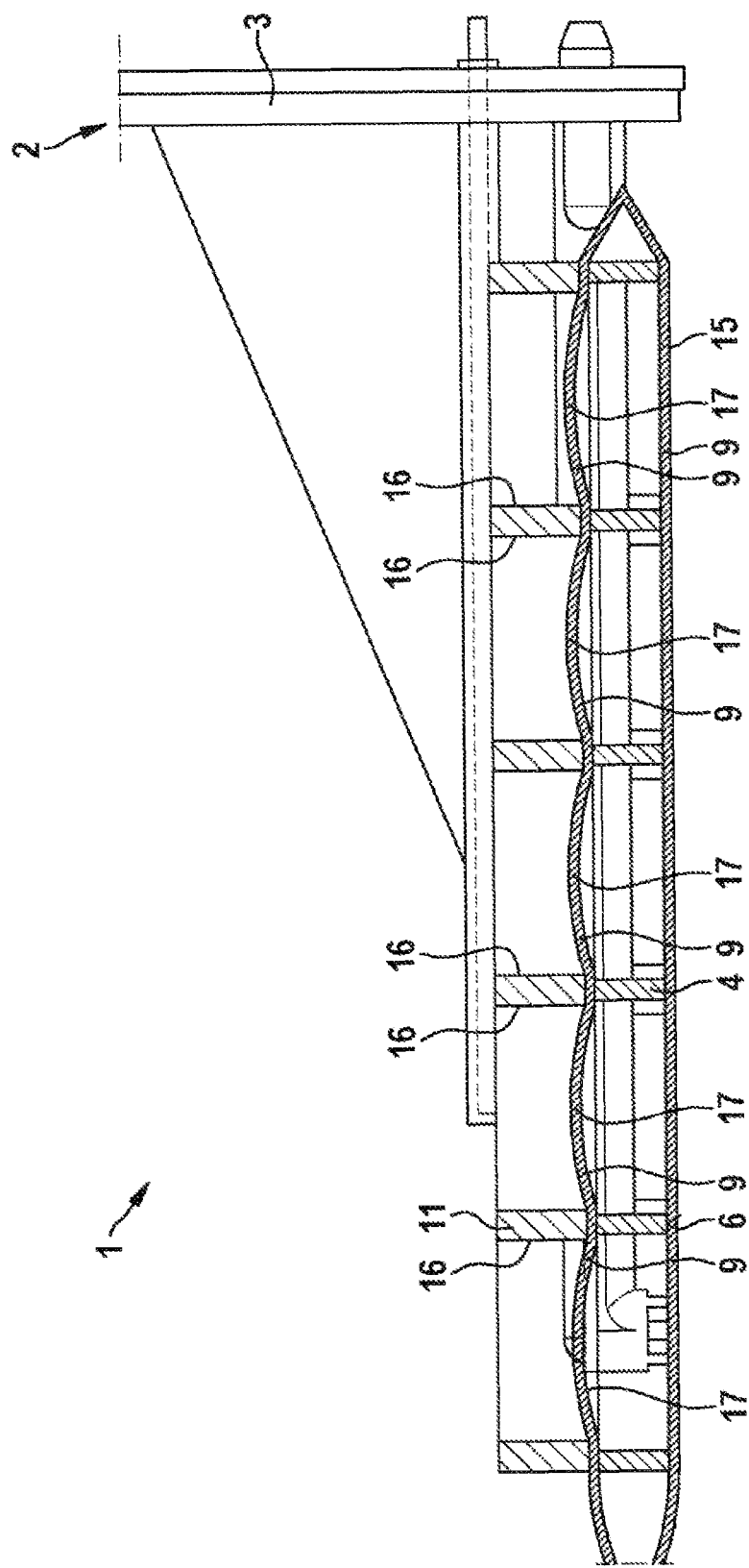
FIG. 3 a section view of the liquid removal module.

FIG. 3, for clarification, shows the liquid removal module 1 in a section view through the grid structure. Here the bulges 17 are clearly evident in the region of each opening 16. Due to the structural similarity of the heating element 11 and removal part 4, these together form in each case one of the openings 16. According to an alternative embodiment, the filter element together with the heating element 11 can form a preassembly group such that the filter element 9 is attached, in particular glued or welded, to the heating element 11 forming the bulges 17. Then the heating element 11 need merely be placed on the top 10 of the removal part 4.

Figure 4:
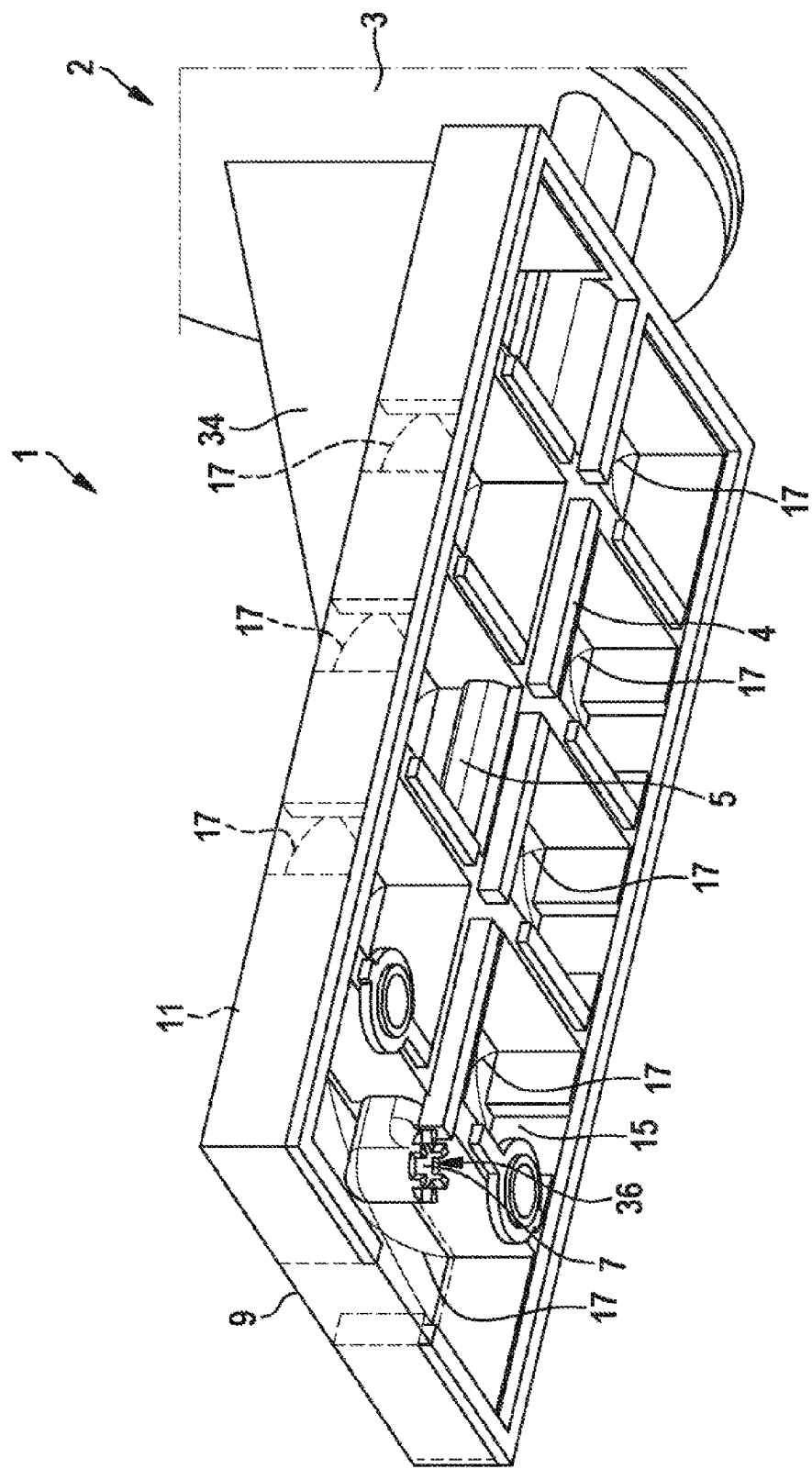
FIG. 4 an underside view of an alternative embodiment of the liquid removal module.

According to the embodiment example of FIG. 4, it is also conceivable to form the grid structure substantially by the heating element 11 alone. It is also conceivable that the filter element 6 or filter mesh 15 lies closely on the removal part 4 and/or heating element 11, as shown in FIG. 4. Preferably here corresponding bulges 17 are formed over at least some of the openings 16.

Figure 5:
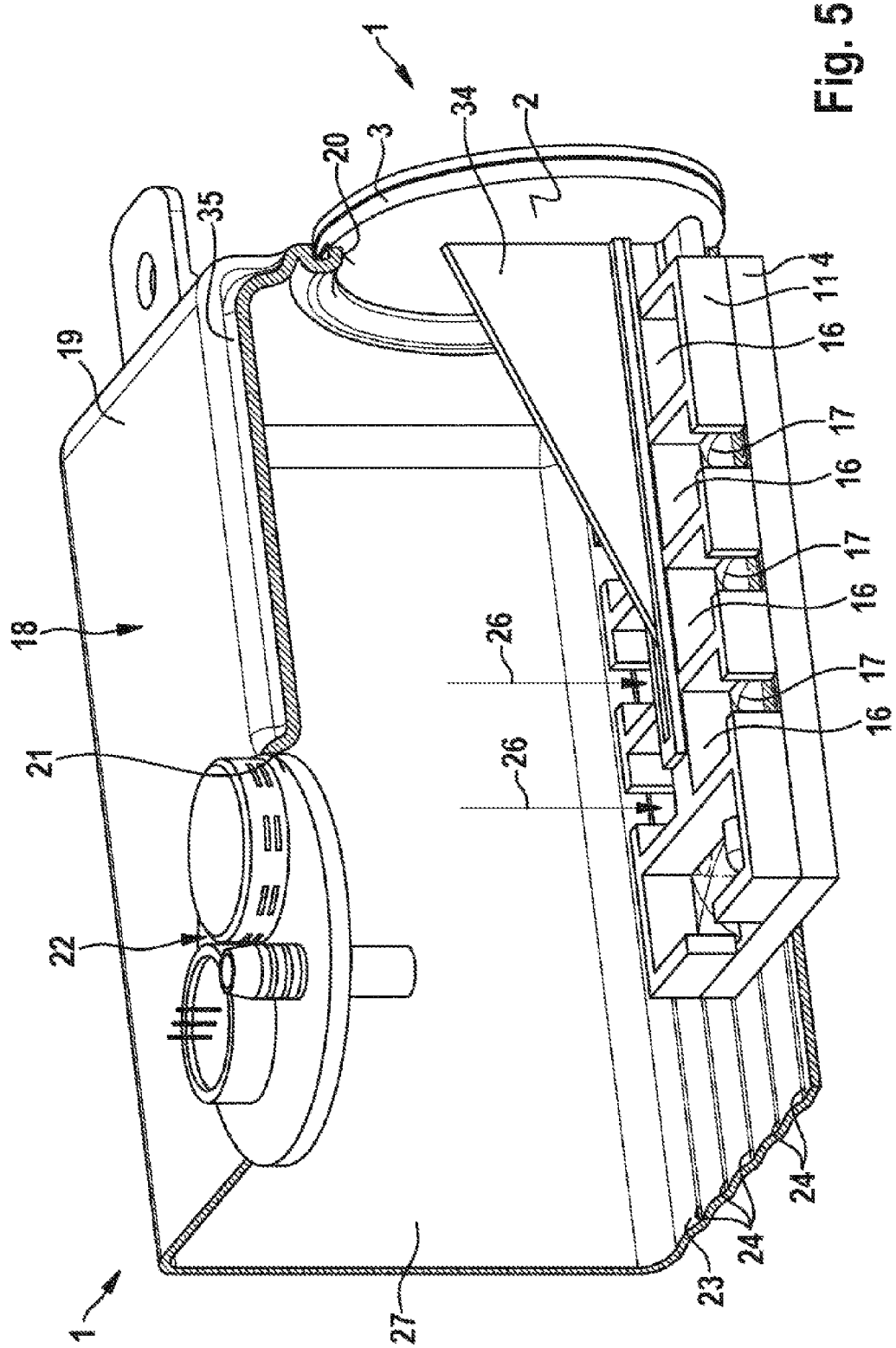
FIG. 5 a liquid tank with the liquid removal module.

FIG. 5 shows the arrangement of the liquid removal module 1 in a liquid tank 18. The liquid tank 18 comprises a wall 19 which on one side has a first tank opening 20 and on the top a second tank opening 21. The opening 21 is closed by a purge unit 22 inserted therein, which will not be discussed in more detail here.

The tank opening 20 is closed by the flange part 3 of the liquid removal module 1. Due to the formation of the liquid removal module 1, the removal part 4, by its lateral insertion into the liquid tank 18, extends substantially parallel to the tank floor 23 which is provided with corrugated dirt traps 24. The removal opening 7 thus faces the tank floor 23. Preferably the removal part 4 lies with its underside 6 on the tank floor in regions. Preferably the removal part on its underside 6, as shown in FIGS. 1 and 2, has several recesses 25, of which here only some carry reference numerals. The recesses 25 allow the penetration of liquid into the removal region located inside the grid structure when the removal part 4 lies on the floor 23, even if the floor 23 were formed flat. If the recesses 25 are provided, the filter element 9 or filter mesh 15 advantageously surrounds the entire removal part so that it is ensured that liquid which passes through the recesses 25 into the removal region is also filtered. Substantially the liquid is however drawn through the filter mesh arranged on the top 10 when the liquid is extracted from the liquid tank 18 via the removal opening 7 and removal channel 5, as indicated by arrows 26. If recesses 25 are not provided, it is guaranteed that the liquid flows into the removal region substantially through the openings 16.

The bulges 17 are formed curving opposite the removal flow direction. This has the advantage that firstly the filter area is enlarged and secondly it is more difficult for dirt particles to settle on the filter 9. In addition, by the elastic design of the filter element 9, the bulges 17 have the effect that on removal or extraction of liquid from the tank 18, these can yield and for example deform such that they curve in the opposite direction, preventing air from being drawn into the filter interior or the removal region. The bulges 17 thus form a type of reserve which allows further extraction of liquid, in particular on low fill levels of the liquid tank, without air being drawn in. This is advantageous in particular at low temperatures which could lead to freezing of the liquid present in the liquid tank 18.

Whereas in the advantageous embodiment examples, bulges are shown only on the top 10 of the removal part 4, in a preferred embodiment it is provided that one or more bulges are also provided on the underside 6 of the removal part 4, which also curve opposite the removal flow direction or in the direction of the tank floor 23, whereby further liquid is provided for extraction from the tank floor 23. In addition it is conceivable that the filter mesh has slight undulations, folds or similar forms which serve to enlarge the area and relieve stress, in particular on freezing of the liquid in the tank.

Figure 6:
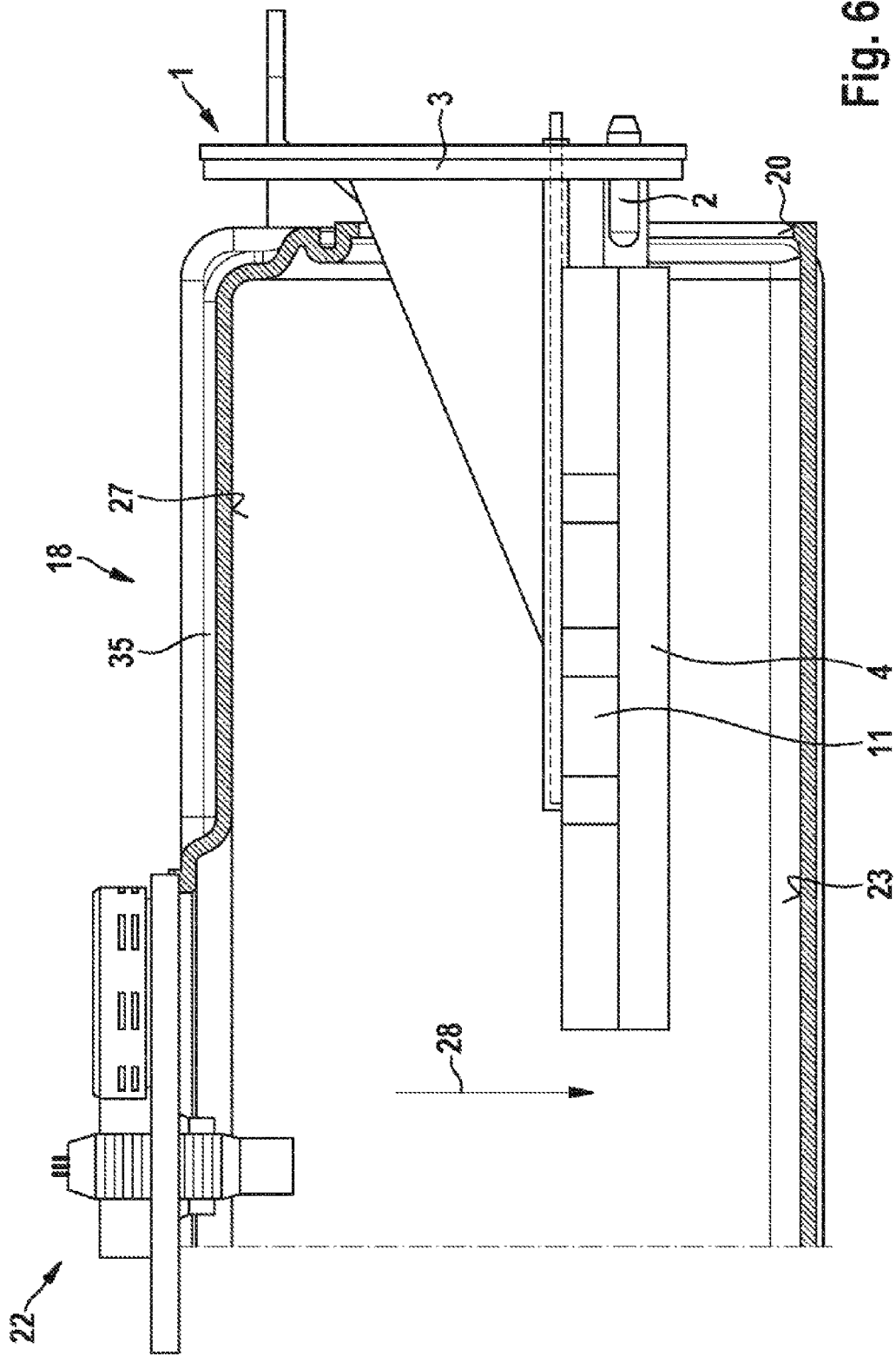
FIG. 6 an assembly position of the liquid tank.

The removal part 4 is arranged on an edge region of the flange part 3 so that the centre axes of the removal part 4 and flange part 3 are arranged offset to each other. This allows a favorable positioning of the removal part 4 and hence the removal opening 7 on the tank floor 23. FIG. 6 for this shows an assembly step for mounting the liquid tank 18 with the liquid removal module 1. The preferably circular tank opening 20 has a diameter which allows the removal part 4 to be inserted in the tank interior 27 together with the heating element 11. As soon as the removal part 4 is in the tank interior 27, the liquid removal module 1 is shifted in the direction of the tank floor 23, as indicated by an arrow 28, until the flange part 3 is arranged coaxial to the tank opening 20. Then the liquid removal module 1 is pressed as far as the stop, i.e. until the flange 3 lies on the wall of the liquid tank 18. Preferably then the flange part 3 is welded or glued to the wall 19 of the liquid tank 18 to guarantee a sealed and secure connection. In principle it is also conceivable to provide the tank opening 20 in the tank floor 23 and orient the flange part 3 and removal part 4 substantially parallel to each other so that in the fitted state, the removal part 4 lies on the tank floor 23 and the flange part 3 closes the tank opening 20 in the tank floor 23. It is also conceivable that the removal part 4 is formed directly by the flange part 3, and the heating element and filter element 9 extend over the flange part 4. This is particularly preferred for installation of the liquid removal module 1 in a tank opening which is formed in the tank floor 23.

As an alternative to the embodiment shown here of the liquid removal module for lateral arrangement on the liquid tank 18, in a preferred embodiment not shown here, the liquid removal module is formed for arrangement on/in a tank opening formed in the tank floor 23. In this case the removal part 4 also has a circular base area and is arranged parallel to the flange part 3. Particularly preferably the flange part 3 co-forms the removal part 4.

The liquid tank 18 has a depression 35 leading from the tank opening 20 to the tank opening 21, in which can be laid in particular a heated pressure line of the delivery device described above which leads to the purge unit 22 and only from there in the direction of a consumer. Thus by heat cavity formation in a completely frozen liquid tank 18, this can economically be changed.

Figure 8:
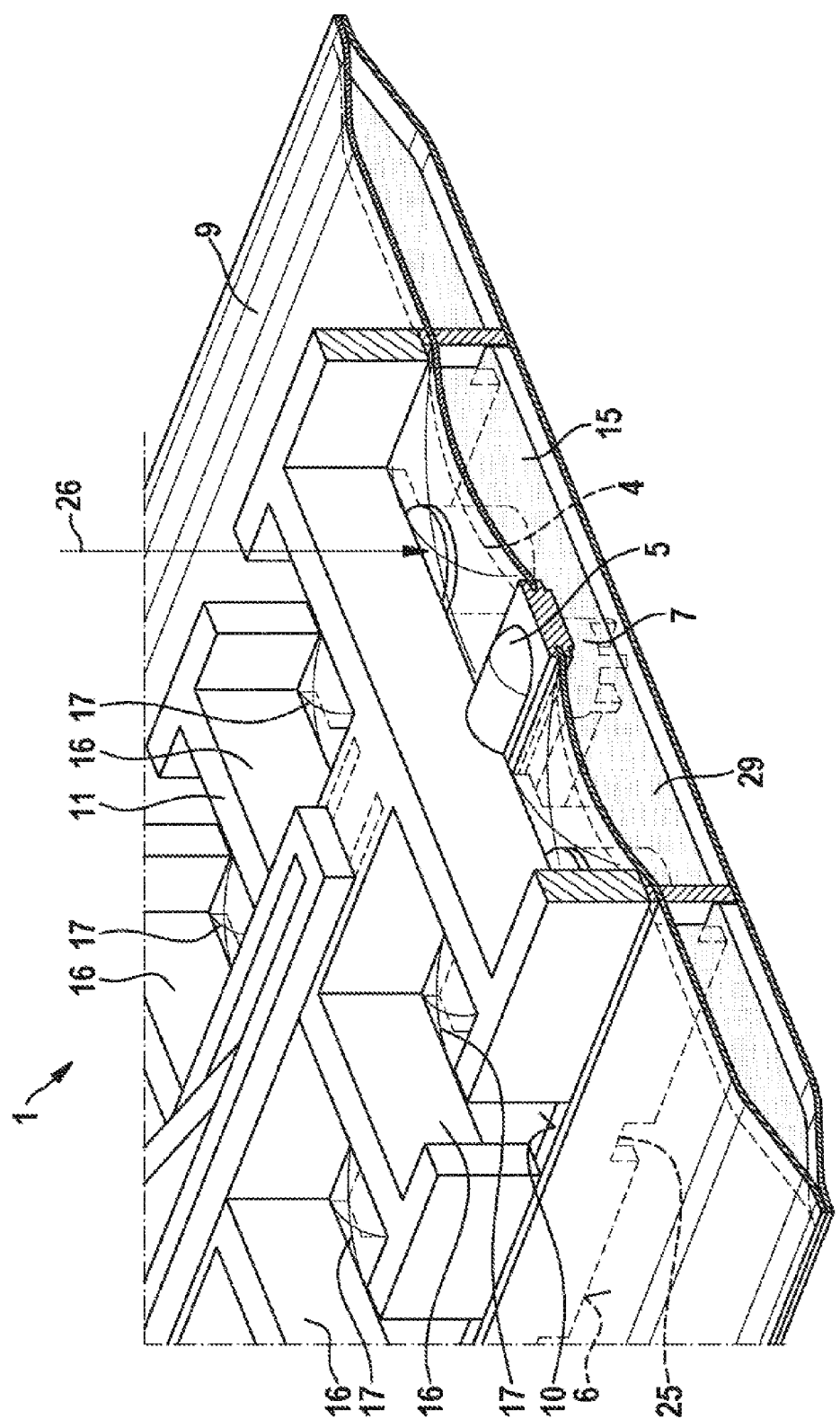
FIG. 8 a section view through the liquid removal module according to an advantageous refinement.

FIG. 8 shows an advantageous refinement of the liquid removal module 1 in which the filter element 9 surrounding the removal part 4 has one or more intermediate filter elements 29 which are preferably made of the same filter mesh 15 or a finer or coarser filter mesh. The filter elements 29 preferably extend from the top of the filter to the underside of the filter, transversely and/or longitudinally through the filter element 9. FIG. 8 shows an intermediate filter element 29 which extends transversely through the filter element 9. Such intermediate filter elements 29 thus form an additional filter stage.

FIG. 9 shows a further embodiment of the liquid removal module in a perspective exploded view. According to this embodiment the filter element 9 is formed by a filter carrier 30 and a filter mesh 31 held by the filter carrier 30. The structure of the filter carrier 30 corresponds to the grid structure of the heating element 11 and removal part 4, so that it further forms the openings 16. In the region of the openings 16 the filter mesh is formed such that in each case it forms a further bulge 17 which is oriented or curved opposite the removal flow direction, i.e. in the direction of the tank floor 23. The filter element 9 shown in FIG. 9 and the bulges 17 can thus be pre-assembled into a preassembly group and then connected with the removal part 4 and/or heating element 11. Naturally it is also conceivable to provide a first filter element 9 on the underside of the removal part 4 and a corresponding second filter element on the free top side of the heating element 11, the bulges 17 of which are curved in the opposite direction. It is also conceivable to connect in series two filter elements 9 as shown in FIG. 9. In a further embodiment only some or even only one of the openings 16 is provided with bulged filter element regions.

FIG. 10 shows an advantageous embodiment of the flange part 3 which has several screw threads 32 to receive a delivery device. The screw holes 32 are each fitted with two retaining elements 33 protruding in a shaft-like manner, which ensure that the delivery device predominantly loads the screws axially so that smaller screws or a smaller number of screws can be used. The screw holes 32 are preferably not threaded, so that the screws can be screwed directly into the flange part 4 made of plastic.

In an embodiment example not shown here, the receiver channel 5 preferably runs directly through the heating element 11 and is preferably formed through its plastic molding. Thus the heating element 11 itself forms the removal part 4. According to a further embodiment the removal channel 3 and removal opening 7 are formed by the filter carrier 30 or a filter carrier mounted otherwise.

The connection lines 13 are preferably themselves formed as heating lines so that in particular when arranged close to the receiver channel 5, these can also be heated and where applicable thaw frozen liquid. Alternatively or additionally at least one connection line 13 can be designed as passive heating of the removal channel 5. The heat is then distributed from the PTC elements and/or aluminum body of the heater via the lines along the removal channel 5.

Due to the planar grid structure of the heating element 11, a large quantity of liquid can be thawed. The filter element can also be molded when the aluminum body of the heating element 11 is coated. Then the lower filter side is folded over and for example connected to the removal part 4 or a separate filter carrier by welding, wherein the seal must be guaranteed only on the edge region of the filter carrier and the region of the support surface. It is also conceivable that a filter element 9 forming a construction unit as shown in FIG. 9 can be fixed by releasable connection, for example by catches, to the receiver part 4 and/or heating element 11. The intermediate filter elements then also serve as protection inside the filter element 9. The spaces between different filter layers of the filter element 9 can be guaranteed by spacers.

By contact of the filter element with the heating element 11, the heat emitted by the heating element 11 can be transferred directly into the filter element 9 so that this is rapidly thawed and ready for operation. Due to the low filter height or small spacing between the different filter layers and a small spacing from the tank floor 23, it is possible to shift the heating element 11 close to the tank floor 23 so that forces acting on the heating element 11 are reduced and the resulting possible movement of the heating element reduced. Thus the heating element 11 will rapidly freeze at temperatures below freezing point and thus be protected by ice against possible damage from liquid enclosed in the ice, which expands on freezing. In addition, due to its own small height, the heating element 11 can reduce the effective forces. By defined support surfaces of the liquid removal module 1, defined pressure forces can be exerted on the tank floor 23 during assembly, whereby tolerances of form, position, angle and flatness of the liquid removal module 1 and the liquid tank 18 in the interface region can be compensated. Preferably the connecting interfaces between the different elements of the liquid tank 18 and/or the liquid removal module 1 are designed such that over the entire life, at least one support surface is in contact with the tank floor 23. The connection between the removal part 4 and the flange part 3 is preferably made elastically deformable so that tolerances can be compensated and preferably the removal part 4 pressed in the direction of the tank floor 3 in the fitted state. For this the rib 34 is provided which runs between the flange part 3 and removal part 4. The rib 34 is preferably formed of one piece with the removal part 3 and lies in a recess of the heating element 7. The interface between the rib 34 and flange part 3 is preferably formed by welding, mirror welding or similar methods.

In addition it is also conceivable to provide the liquid removal module 1 with a fill level sensor and/or a return.

By utilizing surface tensions and capillary effects, and by corresponding choice of filter material mesh and geometric design of the filter element 9, the volume of non-extractable liquid in the liquid tank 18 with a flat tank floor 23 without a pump sump can be substantially reduced.

The advantageous embodiment of the filter element 9 described above ensures that if the filter element 9 is briefly not completely in the liquid, the liquid removed from the filter interior or the removal region can be extracted by the yielding or deformation of the filter material 9 or bulges 17 even if air penetration into the chamber region is prevented by the liquid residue still adhering to the outside of the filter element 9 and/or liquid retained due to filter unevenness. Preferably the tank floor 23 has a slope in the direction of the removal direction 7.

The invention claimed is:

1. A liquid removal module (1) for removing liquid from a liquid tank (18), comprising a main body (2) which can be arranged in and/or on the liquid tank (18) and has a liquid removal device (36) with at least one removal opening (7) which can be associated with the tank interior (27) and bears at least one filter element (9) associated with the removal opening (7), wherein the filter element (9) which is elastically deformable at least in regions is arranged/formed such that it has at least one bulge (17) oriented opposite the removal flow direction (26), wherein for introduction of the liquid removal module (1) into the liquid tank (18), the main body (2) comprises a flange part (3) for closing a tank opening (20) of the liquid tank (18) and a removal part (4) protruding into the tank interior (27), wherein the filter element (9) comprises a filter carrier (30), and wherein at least one of the filter carrier and the removal part (4) is formed as a heating element (11).

2. The liquid removal module as claimed in claim 1, characterized in that the removal part (4) has a planar grid structure which forms several openings (16).

3. The liquid removal module as claimed in claim 2, characterized in that the filter element (9) extends over the removal part (4) and bulges opposite the removal flow direction over at least one of the openings (16).

4. The liquid removal module as claimed in claim 3, characterized in that the filter element (9) extends over the removal part (4) and bulges opposite the removal flow direction over each of the openings (16).

5. The liquid removal module as claimed in claim 1, characterized in that the filter element (9) is welded to the removal part (4) in regions to form the at least one bulge (17).

6. The liquid removal module as claimed in claim 1, characterized in that the filter element (9) also comprises a filter mesh (31), wherein the filter carrier (30) can be/is applied structurally matching on the removal part of the main body (2), wherein the filter element (9) is welded and/or clamped to the filter carrier (30) to form the at least one bulge (17).

7. The liquid removal module as claimed in claim 1, characterized in that the removal part (4) is arranged eccentrically to the flange part (3).

8. The liquid removal module as claimed in claim 1, characterized in that the filter element (9) surrounds the removal part (4) of the main body (2) which has the removal opening (7).

9. A liquid tank (18) for a vehicle, having at least one wall (19) with a tank opening (20), wherein in and/or on the liquid tank (18) is arranged a liquid removal module (1) for removing liquid from the liquid tank (18), which closes the tank opening (20), characterized by the formation of the liquid removal module (1) as claimed in claim 1.

10. The liquid removal module as claimed in claim 1, characterized in that the removal part (4) has a planar grid structure which forms several openings (16) and can be arranged parallel to the tank floor (23) of the liquid tank (18).

11. The liquid removal module as claimed in claim 1, characterized in that the heating element (11) is plastic-coated.

12. The liquid removal module as claimed in claim 1, characterized in that the removal part (4) is arranged on an edge region of the flange part (3), and extends substantially perpendicular to the flange part (3).

13. The liquid removal module as claimed in claim 1 wherein the filter carrier is formed as a heating element (11).

14. The liquid removal module as claimed in claim 13 wherein the removal part (4) is formed as a heating element (11).

15. The liquid removal module as claimed in claim 1 wherein the removal part (4) is formed as a heating element (11).

16. A liquid removal module (1) for removing liquid from a liquid tank (18), comprising a main body (2) which can be arranged in and/or on the liquid tank (18) and has a liquid removal device (36) with at least one removal opening (7) which can be associated with the tank interior (27) and bears at least one filter element (9) associated with the removal opening (7), characterized in that the filter element (9) which is elastically deformable at least in regions is arranged/formed such that it has at least one bulge (17) oriented opposite the removal flow direction (26), characterized in that for introduction of the liquid removal module (1) into the liquid tank (18), the main body (2) comprises a flange part (3) for closing a tank opening (20) of the liquid tank (18) and a removal part (4) protruding into the tank interior (27), characterized in that the filter element (9) comprises a filter mesh (31) and a filter carrier (30), wherein the filter carrier (30) can be/is applied structurally matching on the removal part of the main body (2), wherein the filter element (9) is welded and/or clamped to the filter carrier (30) to form the at least one bulge (17), and characterized in that the filter carrier and/or the removal part (4) are formed as a heating element (11).

17. The liquid removal module as claimed in claim 16, wherein the filter carrier is formed as a heating element (11).

18. The liquid removal module as claimed in claim 17, wherein the removal part is formed as a heating element (11).

19. The liquid removal module as claimed in claim 16, wherein the removal part is formed as a heating element (11).

* * * * *